US 6,291,037 B1

(12) United States Patent
Bakker et al.

(10) Patent No.: US 6,291,037 B1
(45) Date of Patent: *Sep. 18, 2001

(54) PACKAGING FILM FOR FORMING PACKAGES (76) Inventors: William J. Bakker, R.R. #1, Orangeville, Ontario (CA), L9W 2Y8; N. A. Williams, 42 Addison Crescent, Don Mills, Ontario (CA), M3B 1K8

(*) Notice: Subject to any disclaimer, the term of this patent is extended or adjusted under 35 U.S.C. 154(b) by 0 days.

This patent is subject to a terminal disclaimer.

(21) Appl. No.: 09/396,929

(22) Filed: Sep. 15, 1999

Related U.S. Application Data (62) Division of application No. 08/699,332, filed on Aug. 19, 1996, now Pat. No. 5,993,942, which is a continuation of application No. 08/638,160, filed on Apr. 26, 1996, now abandoned, which is a continuation of application No. 08/089,462, filed on Jul. 12, 1993, now Pat. No. 5,511,360, which is a continuation of application No. 07/873,844, filed on Apr. 27, 1992, now Pat. No. 5,249,410.

(51) Int. Cl.[7] ............................. B65D 41/24; B65D 41/54
(52) U.S. Cl. .................. 428/34.7; 428/34.6; 428/34.9; 428/35.2; 428/192; 428/195; 428/200; 428/134; 428/137; 206/497; 215/246; 53/442
(58) Field of Search .................. 428/35.2, 34.5, 428/34.6, 192, 195, 200, 34.9, 34.7, 134, 137; 206/497; 215/246; 53/442

(56) References Cited

U.S. PATENT DOCUMENTS

| | | |
|---|---|---|
| 3,189,702 | 6/1965 | Wall et al. . |
| 3,260,775 | 7/1966 | Orr ........................................ 264/94 |
| 3,324,625 | 6/1967 | Dulmage ................................. 53/42 |
| 3,345,797 | 10/1967 | Von Stoeser ............................ 53/39 |
| 3,354,604 | 11/1967 | Amberg et al. ......................... 53/42 |
| 3,460,317 | 8/1969 | Carter et al. .......................... 53/329 |
| 3,491,510 | 1/1970 | Sternau .................................. 53/42 |
| 3,494,098 | 2/1970 | Sternau ................................ 53/329 |
| 3,507,093 | 4/1970 | Marion ................................. 53/141 |
| 3,514,299 | 5/1970 | Thanhauser .......................... 99/171 |
| 3,528,867 | 9/1970 | Leatherman et al. . |
| 3,549,451 | 12/1970 | Kugler . |
| 3,621,637 | 11/1971 | Sternau ................................ 53/329 |
| 3,628,301 | 12/1971 | Vermeulen . |
| 3,703,066 | 11/1972 | Marion et al. ......................... 53/296 |
| 3,760,154 | 9/1973 | Konger . |
| 3,800,502 | 4/1974 | Vermeulen ............................ 53/329 |
| 3,801,246 | 4/1974 | Gustavsson ....................... 425/174.4 |
| 3,838,550 | 10/1974 | Mueller ................................. 53/39 |
| 3,838,805 | 10/1974 | Amberg et al. ....................... 226/88 |
| 3,877,200 | 4/1975 | Feldman ................................ 53/67 |
| 3,904,465 | 9/1975 | Haase et al. . |
| 3,916,602 | 11/1975 | Doty .................................... 53/329 |
| 3,955,699 | 5/1976 | Amberg et al. . |
| 4,011,119 | 3/1977 | Mitchell et al. ....................... 156/69 |

(List continued on next page.)

FOREIGN PATENT DOCUMENTS

| | | |
|---|---|---|
| 2733767 | 3/1969 | (AU) . |
| 1779656 | 5/1972 | (DK) . |
| 437847 | 6/1991 | (EP) . |
| 1543503 | 10/1968 | (FR) . |
| 758943 | 10/1956 | (GB) . |
| 3148429 | 6/1991 | (JP) . |

Primary Examiner—Rena L. Dye
(74) Attorney, Agent, or Firm—Fay, Sharpe, Fagan, Minich & McKee, LLP (57) ABSTRACT

A packaging film which shrinks to form at least part of a package when exposed to heat. The packaging film includes a thin film substrate that contracts or shrinks when heated and which is substantially transparent to radiant energy. The film also includes a susceptor material carried by the film that is sufficiently opaque to radiant energy to absorb and transfer to the substrate enough heat energy to cause the substrate to shrink, when the film is exposed to a source of radiant energy. In one embodiment the packaging film takes the form of lids of beverage containers.

21 Claims, 9 Drawing Sheets

U.S. PATENT DOCUMENTS

| | | |
|---|---|---|
| 4,025,378 | 5/1977 | Amsden et al. . |
| 4,035,987 | 7/1977 | Nakazato et al. ........................ 53/133 |
| 4,092,817 | 6/1978 | Rist ......................................... 53/298 |
| 4,134,248 | 1/1979 | Freeman ................................. 53/298 |
| 4,156,626 | 5/1979 | Souder . |
| 4,157,723 | 6/1979 | Granzow et al. . |
| 4,184,310 | 1/1980 | Shelby .................................... 53/412 |
| 4,190,757 | 2/1980 | Turpin et al. . |
| 4,226,072 | 10/1980 | Balzer et al. ........................... 53/298 |
| 4,265,954 | 5/1981 | Romanek . |
| 4,518,651 | 5/1985 | Schmit . |
| 4,562,688 | 1/1986 | Mueller .................................. 53/399 |
| 4,609,417 | 9/1986 | Smith . |
| 4,713,510 | 12/1987 | Quick et al. . |
| 4,825,025 | 4/1989 | Seiferth . |
| 4,876,765 | 10/1989 | Mode . |
| 4,878,765 | 11/1989 | Watkins et al. . |
| 4,914,266 | 4/1990 | Parks et al. . |
| 4,917,748 | 4/1990 | Harrison . |
| 4,969,969 | 11/1990 | Powers . |
| 4,982,064 | 1/1991 | Hartman et al. . |
| 4,985,300 | 1/1991 | Huang .................................. 428/332 |
| 5,002,826 | 3/1991 | Pollart et al. . |
| 5,019,681 | 5/1991 | Lorence et al. . |
| 5,113,479 | 5/1992 | Anderson ............................. 392/417 |
| 5,132,144 | 7/1992 | Parks . |
| 5,237,796 | 8/1993 | Bonkowski . |
| 5,244,525 | 9/1993 | Neuwirth et al. . |
| 5,249,410 * | 10/1993 | Bakker et al. ........................... 53/557 |
| 5,511,360 * | 4/1996 | Bakker et al. ........................... 53/442 |
| 5,993,942 * | 11/1999 | Bakker et al. ......................... 428/192 |

* cited by examiner

PACKAGING FILM FOR FORMING PACKAGES

This application is divisional of U.S. application Ser. No. 08/699,332, filed Aug. 19, 1996, now U.S. Pat. No. 5,993, 942, which is a continuation in part of Ser. No. 08/638,160 filed Apr. 26, 1996 now abandoned which is a continuation of Ser. No. 08/089,462 filed Jul. 12, 1993 now U.S. Pat. No. 5,511,360 which is a continuation of Ser. No. 07/873,844 filed Apr. 27, 1992 now U.S. Pat. No. 5,249,410.

FIELD OF INVENTION

This invention relates to a device which may be used to seal food into open-topped containers. In particular, this invention relates to a device suitable for heat shrinking film onto such open-topped containers to seal food or drink inside the container.

BACKGROUND OF THE INVENTION

Presently in the fast food drink industry it is typical to serve a drink in a paper, plastic or other disposable cup topped with a preformed plastic lid. The plastic lid fits tightly over the lip formed at the top of, for example, a paper drink cup, and may include apertures to permit straws or openings to be formed in the lid to directly drink the contents of the cup.

Unfortunately, there are many problems associated with the use of these plastic lids. For example, the lids are generally expensive. Further, the lids are bulky and create problems in storage and in disposal. Further, the seal formed by the lids is dependant upon the lid being placed on properly, and can leak if not properly placed. Finally, the handling of the lid is not completely hygienic.

In order to overcome these problems, various devices and methods have been proposed in which a cover is placed on an open-topped container and then heated to shrink it into sealing engagement with the top of such a container. Examples of such devices can be found in the following United States patents: U.S. Pat. Nos. 3,260,775; 3,354,604; 3,460,317 3,491,510; 3,494,098; 3,507,093; 3,621,637; 3,877,200; 3,838,550; 3,916,602; 4,035,987:4,184,310 and 4,562,688. While the solutions proposed by these prior devices and methods are interesting, they fail to provide a sufficiently cost efficient, easy and inexpensive alternative to preformed rigid plastic lids. As a consequence, rigid plastic lids remain in widespread use. Some of the main failings of these prior devices are that they are bulky, noisy, unresponsive, and expensive. Heating systems comprising blowing air over a hot element and then onto a film require large amounts of unnecessary heat, even when in standby mode, which makes temperature control very difficult. Further, continuous elevated temperatures are expensive to maintain and may be deleterious to the immediate environment.

SUMMARY OF THE INVENTION

Aside from the benefits of increased hygiene and reduced waste, the present invention is directed to providing a practical device which has commercial utility. One aspect of the present device is to provide an energy efficient way of sealing open-topped containers which avoids any substantial build-up of heat. An intermittent source of radiant energy is used, and energy is directed onto an energy absorber located at the specific place where heat is required. Thus, heat is originated where it is needed, when it is needed and a cooler, quieter, safer and more efficient device results.

A packaging film which shrinks to form at least a part of a package when exposed to heat, said packaging film comprising:
  a thin film substrate of the type that contracts when heated and which is substantially transparent to radiant energy;
  a susceptor material carried by the substrate, said susceptor material being sufficiently opaque to radiant energy to absorb and transfer to said substrate sufficient heat energy to cause said film to shrink upon said packaging film being exposed to a source of radiant energy, wherein exposure to said source of radiant energy causes the film packaging to preferentially shrink in a predetermined manner.

DETAILED DESCRIPTION OF THE PREFERRED EMBODIMENT

Figure 1:
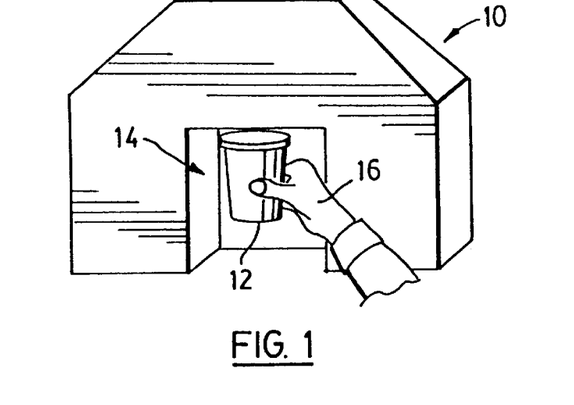
FIG. 1 is a perspective view of a device according to the present invention in use.

FIG. 1 shows device 10 for heat shrinking a thin film onto an open-topped container 12. The housing 10 includes an opening 14 of sufficient size to allow placement of the container 12 within the housing 10. In the embodiment of FIG. 1, placement of the container 12 within the opening 14 is accomplished manually, illustrated by a hand 16.

Figure 5:
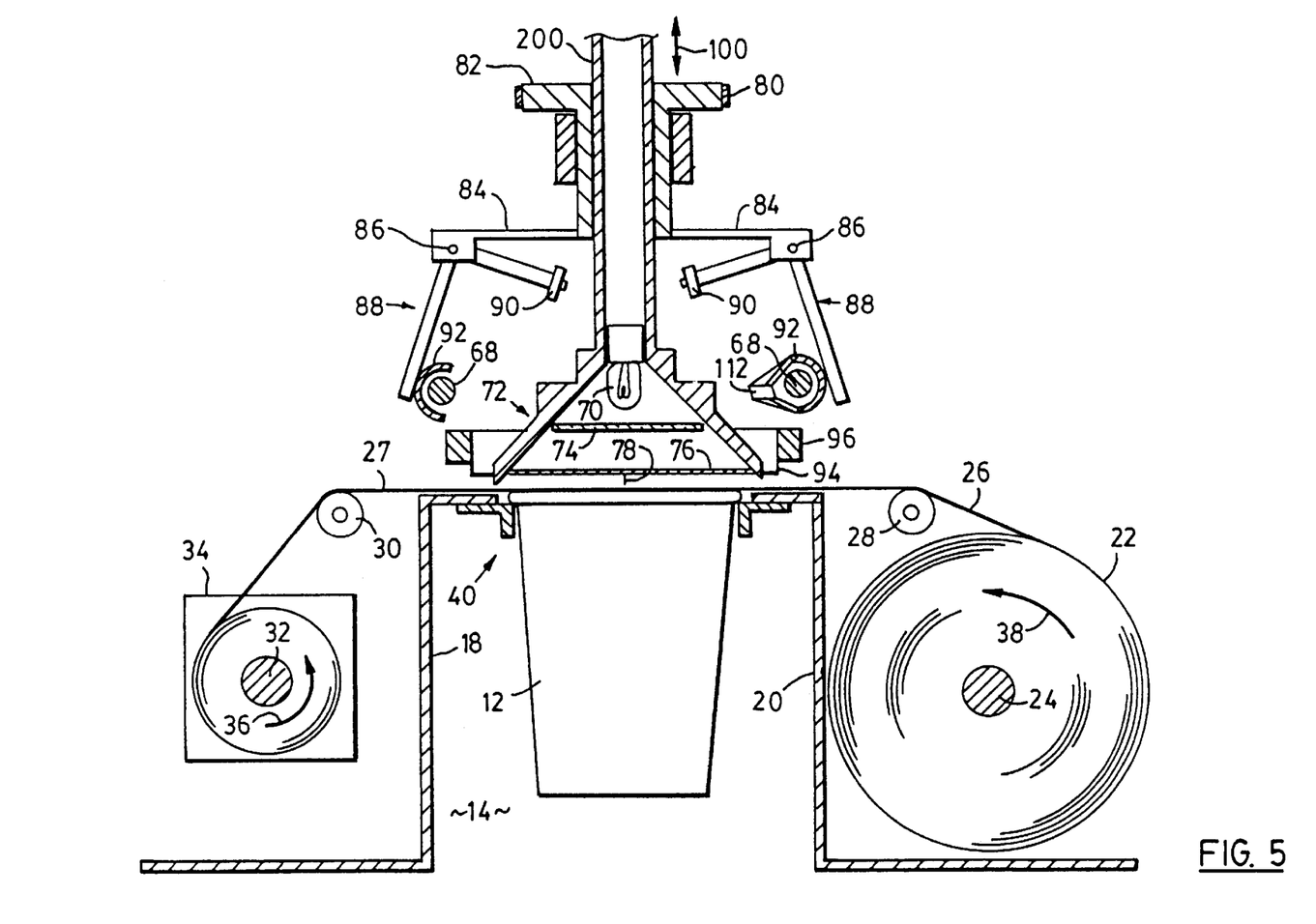
FIG. 5 is a sectional view taken along lines 5—5 of FIG. 4.

Turning to FIG. 5, there is shown a cross sectional schematic view of the operational components of the device 10 of FIG. 1. The container 12 is shown in the opening 14. The opening 14 is defined by side walls 18 and 20 of the device 10. Shown on the right-hand side is a roll of thin plastic film 22 on an axle 24. The film 26 passes over a roller 28 across the top of the container 12 across a second roller 30 and onto a take-up axle 32. Shown at 34 is a rewind motor. It will be appreciated that the rewind motor 34 can rotate the pickup axle 32 in the direction of arrow 36 which will advance the film 26 across the top of the container 12 and cause the roll of film 22 to rotate in the direction of arrow 38. Alternatively, the advancing of the film 26 could be accomplished manually by turning a lever or knob mounted on take-up axle 32.

The film 26 is preferably a bi-axially oriented shrink film as more particularly described below. Good results for lidding containers have been achieved with a 75 gauge polyvinyl chloride film purchased from Reynolds Metals Company at Richmond, Virginia. Other films, such as copolymers, polyolefins and the like may also be appropriate. The film, to be most useful, must be food grade contact-approved by the appropriate regulatory authorities. A 7 inch outer diameter roll of 75 gauge shrink film, which includes a 3" diameter fibre core, will yield approximately 8,000 covers according to the present invention.

Figure 7:
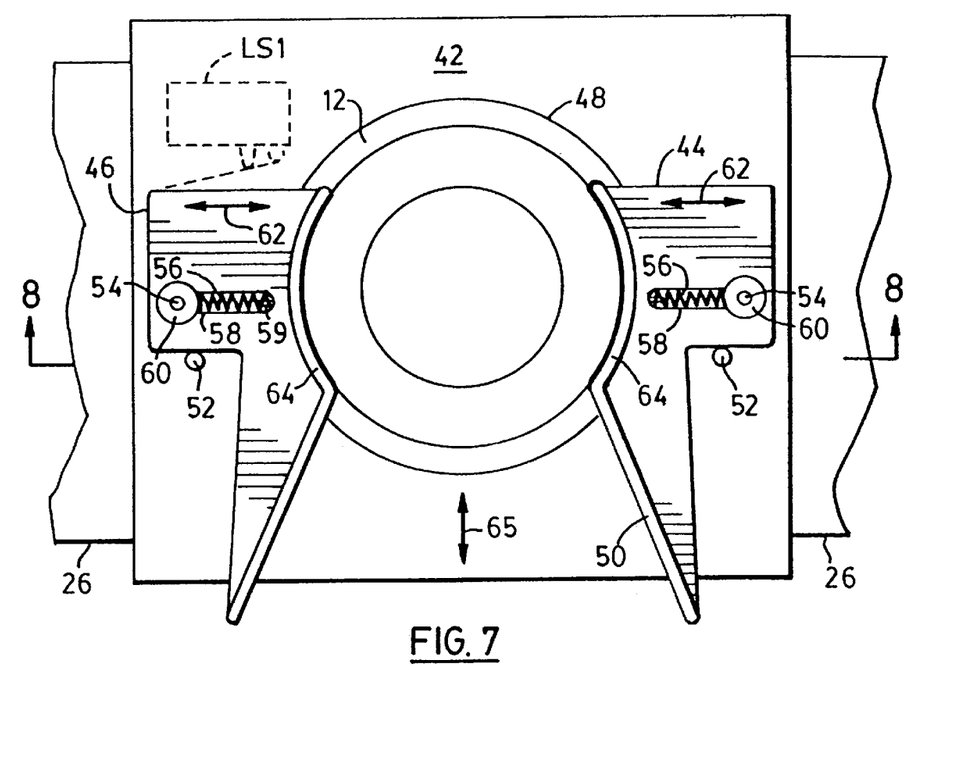
FIG. 7 is a view of a part of the device of FIG. 1.

In FIG. 5, the container 12 is located in a locator identified generally at 40. The locator 40 is shown in more detail in FIGS. 7 and 8. Turning to FIG. 7, there is shown a plate 42 having 8 pair opposed guides 44 and 46. The plate 42 also has an opening 48 located between the guides 44, 46. The guides 44 and 46 are substantially identical and therefore the following discussion in respect of guide 44 applies equally to guide 46.

The guide 44 comprises a rub rail 50 which contacts an outer edge of a container 12. Extending from plate 42 are two posts in respect of each guide 44, 46. In respect of guide 44 there is a stop post 52 and a guide post 54. A slot 56 is formed in the guide 44 and a spring 58 is housed between the guide post 54 and the end of the slot 56. A pin 59 may be used to secure one end of the spring 58. A washer 60 is used to retain the other end of the spring 58 within the slot 56. The washer 60 is placed around the guide post 54. Between the free end 55 of guide post 54 and the washer 60 is a further spring 61. The spring 61 allows the guide plate 44 to articulate away from the plate 42 to facilitate removal of the container 12 from the device 10.

It will now be appreciated that the guide 44 can move laterally in the direction of double ended arrow 62 guided by means of the stop 52 and the guide post 54 with 35 the slot 56. It will also be appreciated that the curved portion 64 of the rub rail 50 will provide an indication to anyone inserting a container 12 into the locator that the container is appropriately located. Appropriately in this sense means centered under the plate opening 48.

Figure 8:
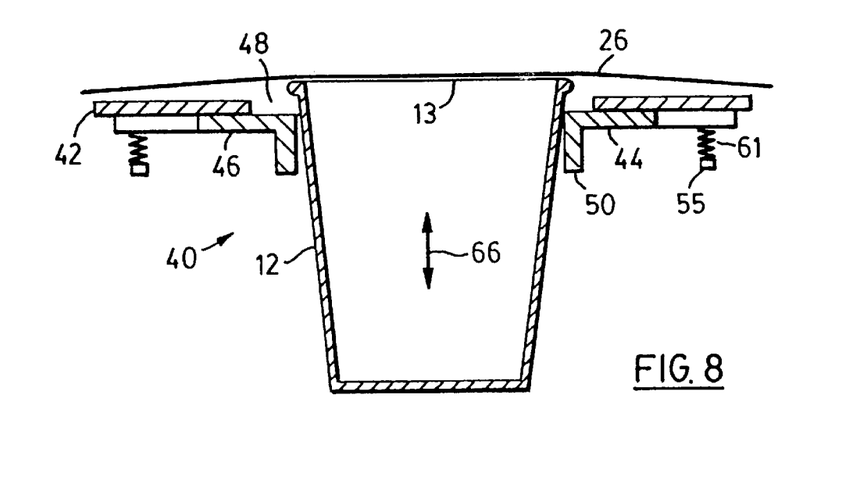
FIG. 8 is a view along lines 8—8 of FIG. 7.

Turning to FIG. 8, the locator 40 of FIG. 7 is shown in cross-sectional view. As can be seen, the guides 44 and 46 are positioned on adjacent side edges of a container 12. The plate opening 48 is shown together with the plate 42. The thin film 26 is also shown stretched across the top 13 of the container 12.

It can now be appreciated that the container 12 can be moved in the direction of double ended arrow 64 into position beneath plate opening 48. During this period, the guides 44 and 46 will gradually open and then close about the periphery of the container 12. Thereafter, as shown in FIG. 8, the container 12 is free to be moved in the direction of double ended arrows 66 as will be discussed below. It will be appreciated that containers 12 of varying diameter can thus be accommodated by the instant invention, since all containers will be centered by the locator beneath the plate opening 48. This is desirable in a food services environment where cup size selections typically include small, medium and large.

Turning now to FIG. 5, a container 12 is shown centered in locator 40. A first radiant energy source 68 and a second radiant heater 70 can now be explained. Located above the centered and located container 12 is a top shrink hood 72. The second radiant heater 70 is located within the top shrink hood 72. The top shrink hood 72 includes a glass shield 74 and a heat transfer means 76. In some circumstances the glass shield 74 may not be required, however, to prevent the possibility of splashes reaching the second radiant energy source 70, it is preferred. It may not be necessary to use glass. Plastic or other transparent substances may be appropriate. Good results have been achieved when the heat transfer means 76 is made from a screen aluminum material painted a dark colour, such as black. The dark aluminum heats and cools quickly which is desirable in the circumstances.

A pierce tool 78 is also shown extending outwardly from the heat transfer means 76. The purpose of the pierce tool 78 is to make a vent opening in the thin film to allow gases such as carbon dioxide from a soft drink to escape the container.

Figure 2:
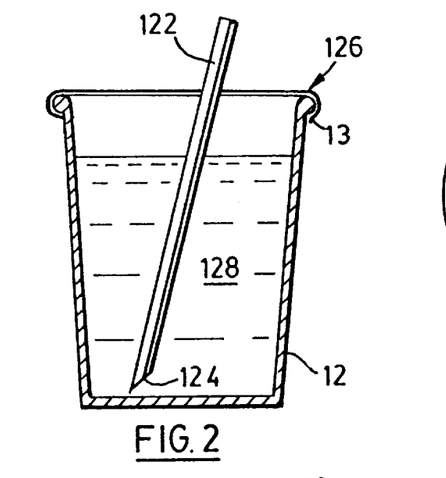
FIG. 2 is a front sectional view of an open-topped container according to the present invention with a heat shrunk cover in place.
Figure 2A:
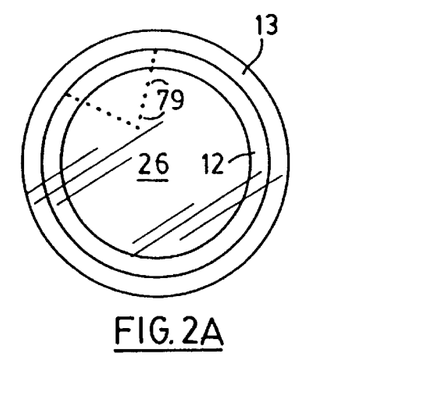
FIG. 2a is a top view of the container of FIG. 2.

An alternative to pierce tool 78 is to form small opaque portions 79 in the shrink film. These opaque portions or "dots" will cause a hot point which may perforate the film as more fully explained below. If desired the hot points can be made in a specified pattern to form a sipping opening or the like, as shown in FIG. 2A. Also shown in FIG. 2 is a straw 122 with a pointed end 124 for piercing the film, shown in place as 126. A fluid, such as a soft drink is shown at 128.

Also shown in FIG. 5 is a drive belt 80 which connects a pulley 82 with a motor. Attached to the pulley 82 are a pair of arms 84. The arms 84 rotate when the pulley 82 is rotated by the belt 80. Depending from the arms 84 about pivot points 86 are pivot arms 88. Pivot arms 88 include a roller 90 at one end and the first radiant energy source 68 at the other end. If preferred, a reflector may be provided such as 92 around the first radiant energy source 68.

Also show in FIG. 5 is a knife or film cutting blade 94 to which is attached a heating element 96. The heated blade 94 ensures a quick clean cut of the thin film, upon the thin film contacting the blade 94. As can be seen from FIG. 5, the blade 94 is below the top hood 72, so the film will be cut to shape just prior to or about the same time as the container 12 contacts the hood 72. Good results have been achieved when the blade is made from a two point center face steel cutting rule, and maintained at a temperature of between 275° F. to 400° F. This format appears to limit smoke and fume generation.

Figure 9:
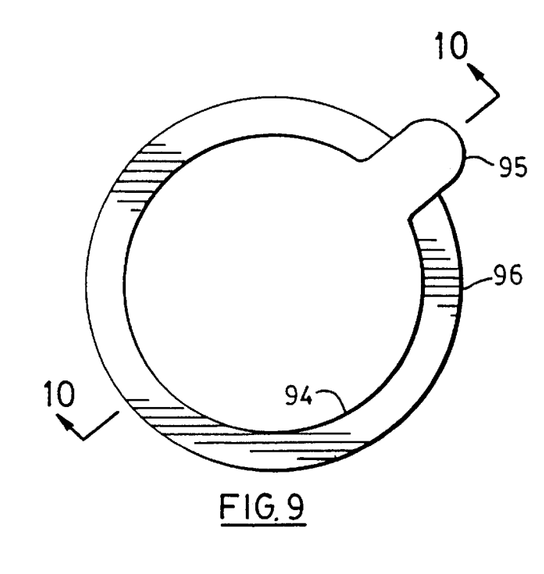
FIG. 9 is an alternate configuration for a knife element shown in FIG. 5.
Figure 10:
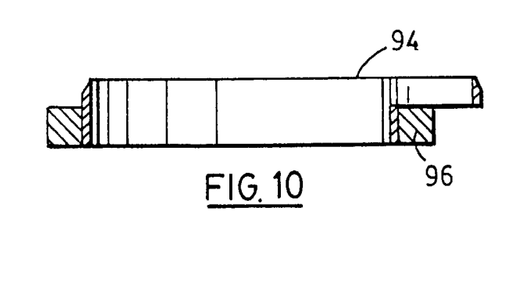
FIG. 10 is a view along lines 10—10 of FIG. 9.

The knife 94 may be circular in shape, or may be as shown in FIGS. 9 and 10. It will be noted that the knife 94 in FIGS. 9 and 10 includes a rounded oblong section 95. This will result in a similarly shaped section being formed in a cut piece of film, as described below, which can be used as a convenient pull tab for removing a cover which has been shrunk onto a container 12. In the preferred embodiment the thin film 26 has a width greater than the width of the knife 94 so that a trim 27 (see FIG. 5) is left after the cut is made, and the trim 27 is strong enough to allow the film 26 to be advanced by a tensile force without tearing.

Figure 6:
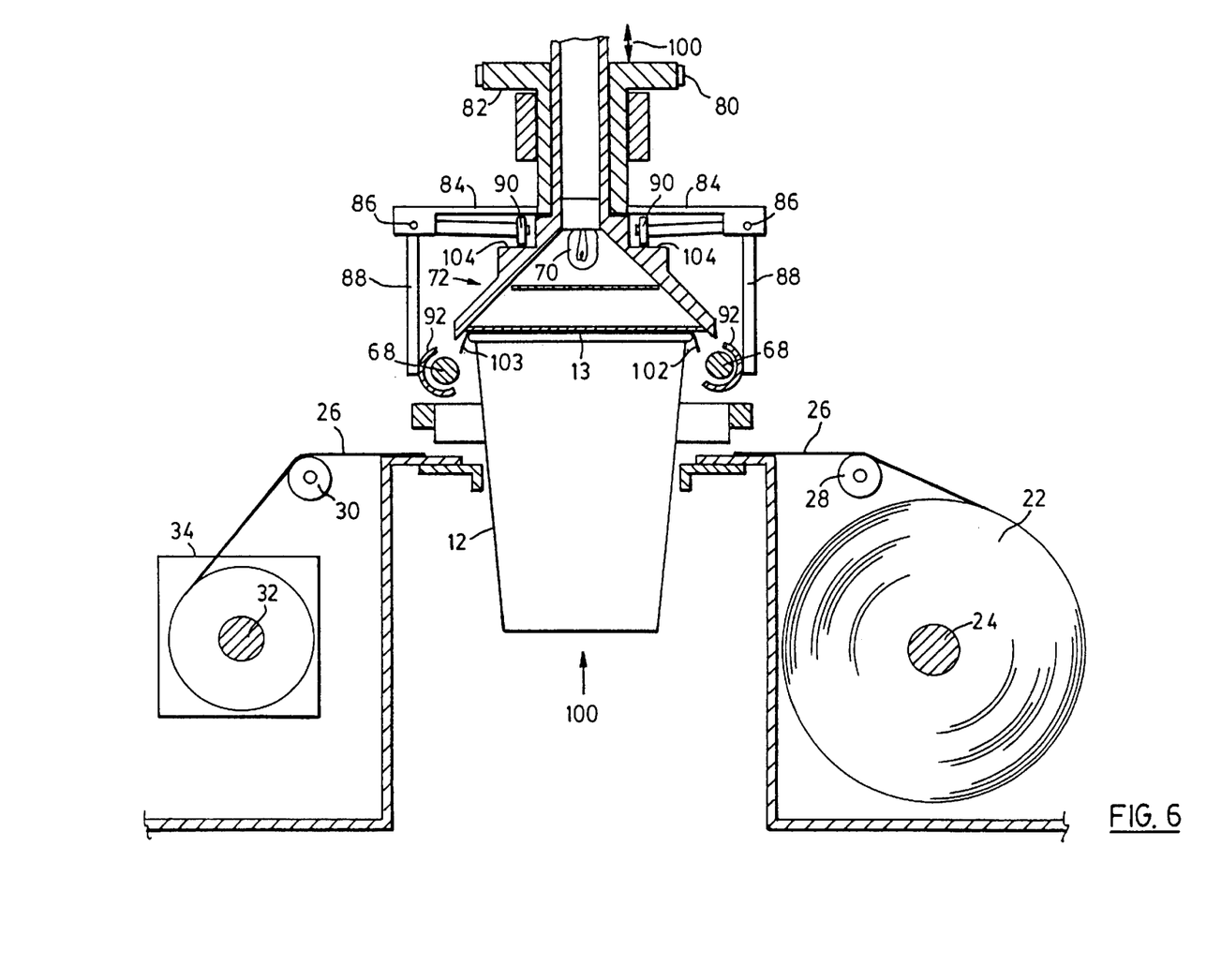
FIG. 6 is a view similar to Figure S with the container in a raised position.

Turning now to FIG. 6, the operation of an instant device can now be understood. In FIG. 6 the container 12 has been raised in the direction of arrow 100. This has had the effect of pushing the film 26 upwardly into engagement with the knife heated film cutter blade 94. This has caused a cut portion of the film shown as 102 to be draped across the top 13 of the container 12. At this point the hood 72 is holding the cut piece of film 102 generally in place. As the container 12 is raised further, the hood 72 is also raised. Rollers 90 then contact a ledge 104 formed on the outer surface of the hood 72. Further upward movement causes the movement of the first radiant energy source 68 about the pivot point 86 until the first radiant energy source 68 is closely adjacent to a draped over edge of cut portion 102 shown as 103. Contact is then made at a limit switch, as explained below in respect of FIG. 11, which energizes a motor 99 (shown in FIG. 4). Upon organization of the motor 99, the belt 80 revolves causing the rotating arms 84 to revolve rotating the first radiant energy source 68 about the periphery of the top of the container 13. Simultaneously with the organization of the motor 99 and the rotation of the first radiant energy source 68, the first radiant energy source 68 is energized to cause radiant energy to be directed towards the dangling edge 103 of the cut portion 102 of the said film 26.

It will be appreciated that the preferred invention causes the first radiant energy source 68 to move into position closely adjacent the downward edge 103 of the cut portion 102. Such movement is preferred because radiant energy obeys the inverse squared rule in which the amount of energy is proportional to an inverse of the square of the distance from the source. By locating the first radiant energy source 68 close prior to being energized, more energy can be usefully used and focused away, for example, from an operator's hands. Also, by the pivoting action, the operator's hands are kept clear of the energy source 68, until the container 12 is in position.

After a predetermined length of time, the first radiant energy source 68 is de-energized and the second radiant energy source 70 is energized by a timer 120. The second radiant energy source 70 energy is directed through the glass shield 74 onto an energy absorbing body 76. This transfer of heat causes a shrinking of the top portion across container 12 of the cut portion 102. Thereafter, the sealed container 12 can be lowered and removed from the apparatus.

A preferred type of energy absorbing body 76 is a darkened aluminum screen. The body 76 is placed very closely adjacent the top portion of the cut section 102 and may be in contact therewith. The darkened screen or body 76 absorbs energy and transfers it onto the top portion. It will be appreciated that aluminum is a suitable material because it will cool rapidly, when the energy source 70 is shut off, thereby preventing premature shrinkage of a top portion on a subsequent container upon being first introduced into the hood 20.

It has been found that the preferred radiant energy sources are Tungsten Halogen Lamps. About 70% of the energy produced by these lamps is in the preferred wavelength range of the infrared (750 millimicrons and beyond).

These lamps are compact, durable, inexpensive and readily available. Lamps in the range of 200 to 300 watts are suitable. It will be appreciated by those skilled in the art that other energy sources which produce sufficient infrared radiant energy may also be used.

It is also to be noted that the radiant energy emitted by such an energy source can be turned on and off instantaneously and focused and directed to the location it is desired, without stray heat energy being produced, and the energy source does not have to be on continuously, or on standby in readiness for a container, which is the case of prior art hot air systems.

Figure 4:
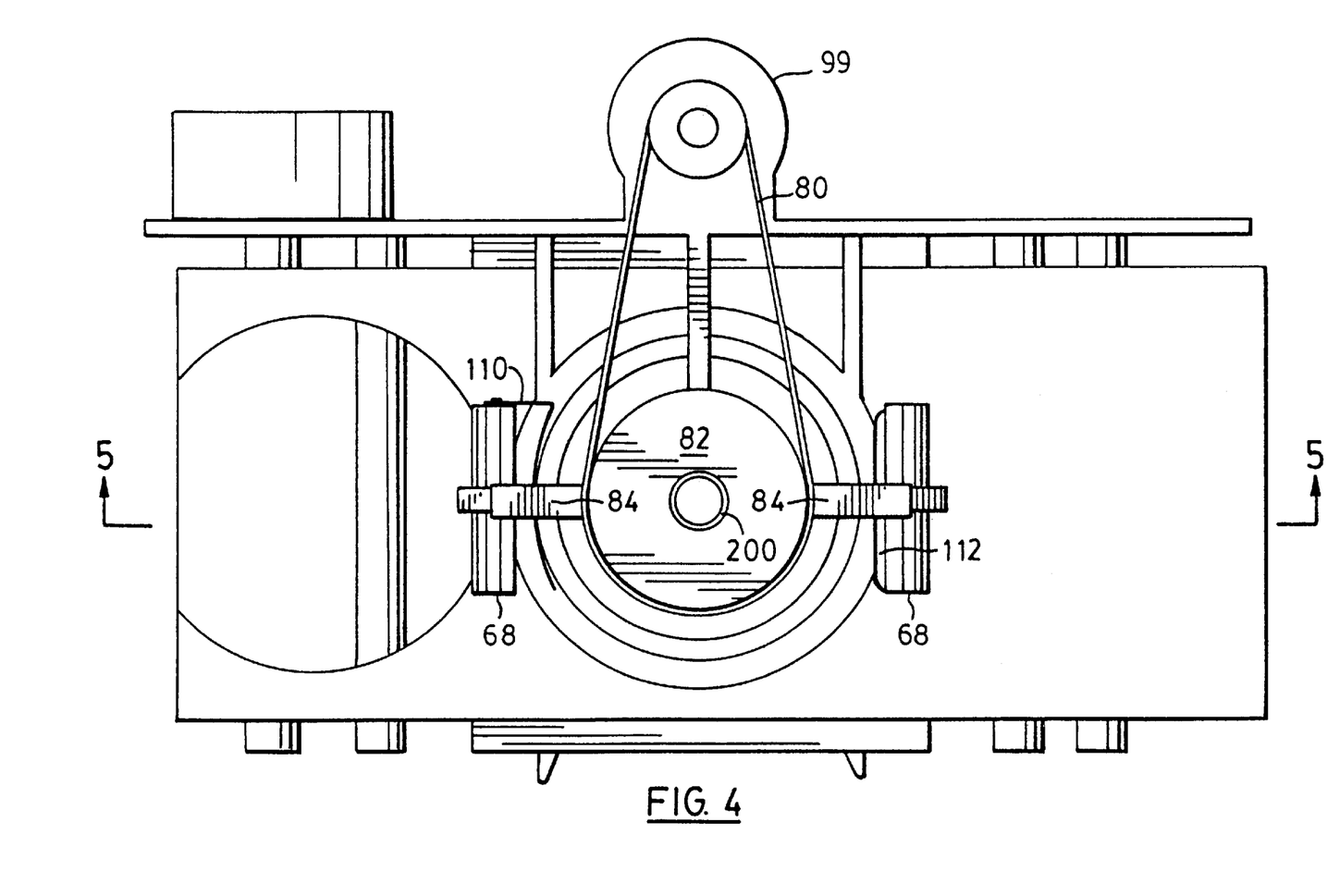
FIG. 4 is a top view of the device of FIG. 1, with the top wall broken away to show the contents.

Turning now to FIG. 4, the belt 80, pulley 82 and drive motor 99 are all shown. Also are shown two rotating arms 84 and two first radiant heaters 68. It will be appreciated by those skilled in the art that fewer or more radiant heating elements could be used according to space requirements and preference. However, when the drive motor operates at 100 rpm, two radiant heat means 68 provides good results. By varying the size of the pulley 82, the speed of revolution of the first radiant energy source 68 can also be varied. Good results have been achieved when the puffy 82 is configured to cause the first radiant energy source 68 to rotate at 100 rpm.

It will also be appreciated that the spinning first radiant energy source 68 could be replaced with a row of fixed position bulbs. However, the process would be slightly more difficult to control, since the total energy output would likely be greater, and more energy expensive. Thus, the moving first energy source 68 is preferred.

Figure 11:
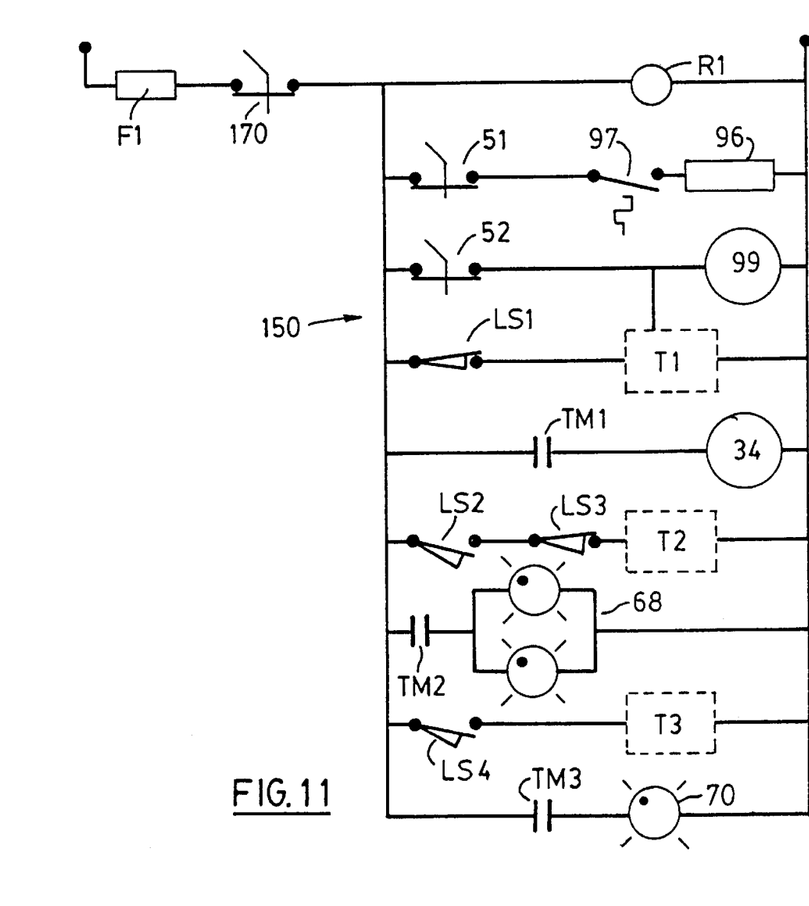
FIG. 11 is a schematic sketch of an electronic control circuit for the prevent invention.

Turning to FIG. 11, a schematic of an electrical system 150 for the instant invention is disclosed, which sets out in more detail the interaction between the container 12 and hood 72 location, and the activation of the various components described above.

One of the characteristics of the electrical design is that it must compensate for the varying rates that the container 12, which is moved by a human hand, enters and leaves the device 10.

In the preferred embodiment the raising and lowering of hood 72 and the motion of locator 40 will trigger microswitches which engage timers as described below. Certain events must take place as hood 72 is raised and other events must take place when hood 72 is lowered.

Referring to the wiring system 150, F1 is a fuse. When the main switch 170 is turned on, a pilot light R lights up. Then, switches S1 and S2 are manually turned on. As shown, S1 turns on resistance heater 96, which heat the knife 94. A thermostatic control is shown at 97. When S2 is turned on, it activates motor 99 and also signals timer T1. Also shown is a relay TM-1. The timer T1 engages motor 34 and advances the film 26 for a single "space", which is determined by the time set on timer T1. Thus when the machine is activated and ready to operate by turning on switch S2, a fresh piece of film 26 is automatically presented. Switch LS1 is situated on plate 42, (shown in ghost outline in FIG. 7) so that when guide 46 rotates outwardly on withdrawal of the container, LS1 also signals timer T1 which engages motor 34 and advances the film in a like manner.

Also shown are switches LS2 and LS3 which close when hood 72 moves upward. These switches activate a second timer T2 which activates relay TM-2 which in turn activates first radiant energy source 68. On the downward motion switch LS3 opens and thereby prevents timer T2 from activating source 68 again.

On the downward motion of hood 72, switch LS4 closes, which activates timer T3 which through a relay TM-3, activates radiant energy source 70 for a predetermined time.

Figure 12:
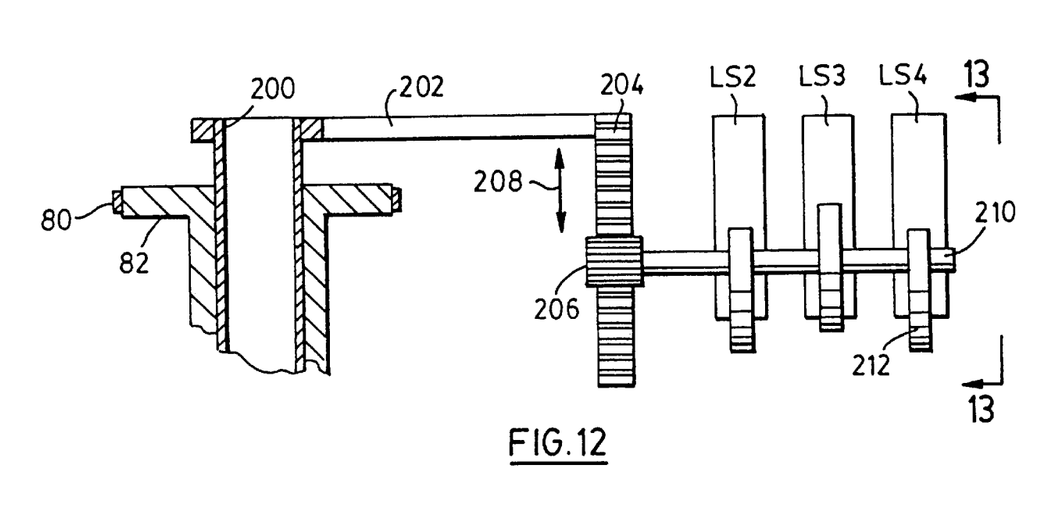
FIG. 12 is an alternate embodiment of a micro switch system according to the present invention.

FIG. 12 shows in schematic form the micro switch interconnections. On the left hand side of FIG. 12 are the belt 80 around the pulley 82. A shaft 200 extends upwardly from the top hood 72. A connecting rod 202 is attached to shaft 200, and will rise and subside with the hood 72 being raised and lowered. Remote from shaft 200 there is a rack 204 connected to the rod 202 which interacts with a pinion 206, in a manner shown by double ended arrows 208. Also shown are a cam shaft 210 attached to eccentric cams 212.

Figure 13A:
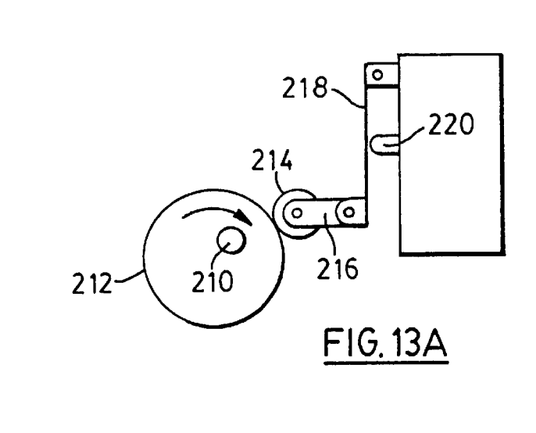
FIG. 13a is a view along lines 13—13 of FIG. 12 in a first position.
Figure 13B:
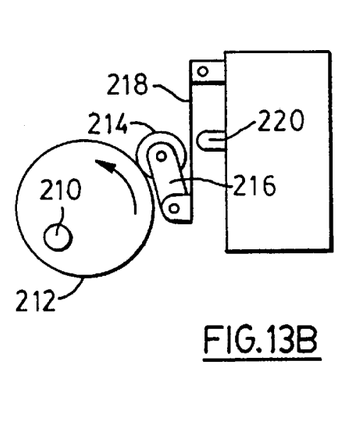
FIG. 13b is a view along lines 13—13 of FIG. 12 in a second position.

Shown in FIGS. 13A and 13B are the means of closing electrical circuits upon rotation of the cam shaft 210 by the pinion 206. A secondary roller 214 is located on a pivot arm 216. When cam 212 is rotated in one direction an electrical spring clip 218 is forced into contact with an electrical contact 220 closing a circuit. Upon being rotated in an opposite direction, the cam 212 urges the pivot arm 216 up and out of the way, and does not close the circuit, as shown in FIG. 13B.

It can now be appreciated that the present invention uses radiant energy from the radiant energy sources to effect shrinkage. Radiant energy is preferred, because it travels relatively unimpeded through transparent mediums such as air or transparent film. The preferred radiant energy source is a Tungsten-Halogen bulb, which is described in more detail above. The present invention has process parameters for heating which depend upon an absorbing means for the radiant energy, and in particular, how close any absorbing means conforms to a theoretically ideal "black body". An ideal "black body" completely absorbs all radiant energy that strikes it and thus is capable of radiating that same energy outward.

The way in which the present invention seals heat shrinkable thin film onto a container, is to employ a first means to transfer heat to the downwardly extending portion of the cut piece of thin film. In this sense, the first means can comprise adapting the thin film to absorb energy, interposing an absorbent body adjacent to thin film, or adapting the area of the container just below the rim to become energy absorbing. The thin film can be adapted to absorb energy by being made from a tinted material, or by being coated with an energy absorbent coating, for example, printing. The ability of the opaque or coated film to absorb radiant energy will vary depending upon what type of tinting or coating is used. A darker or more opaque film will absorb more energy.

An example of a preferred interposed absorbent body is a darkened aluminum screen 112, which moves closely adjacent the edge 103. The darkened portion of the screen will absorb energy and then radiate it, giving rise to heat. The heat will be transferred to the air adjacent to the film, then to the film which will shrink the film.

Figure 3:
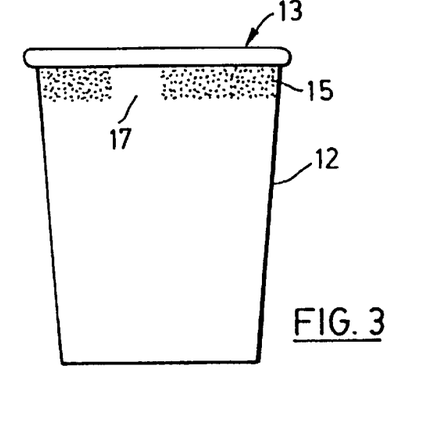
FIG. 3 is a front view of the container of FIG. 2 having a darkened upper band.

The container may be adapted to absorb radiant energy, and thus produce heat in a preferred location, by including a darkened band 15 in the area where heat generation is desired, such as just below the rim. For aesthetic reasons, black bands may not be acceptable, but other coloured bands will also work. With a cooler colour, the exposure to the radiant energy source may need to be slightly longer. However, the length of time of exposure to the radiant energy source can be adjusted in the present invention through adjustments made to the timer T2. A gap 17 may be incorporated into the band 15 to permit the end user to lift the shrunken cover off the container if so desired.

In some circumstances, it may be desirable to urge the film onto the cup. Therefore, the present invention also comprehends the use of a spring wire 110, which trails (or leads) the revolving first radiant heat means 68, and urges the edge 103 into contact with the container 12 just below the top 13.

Turning how to the shrinking film used, certain modifications can be made to the film to improve performance, both in term of speed of shrink, security of attachment and nature of the shrink (which is sometimes referred to herein as preferential shrinking) and in terms of appearance. In particular, when lidding a container a clean finished looking edge is preferred, with minimized distorted or wavy edges. The shrink film is used to form a package to wrap goods, for shipment, or delivery. The shrink film may completely surround the goods and when shrunk, form a complete covering, or may be used to cover parts of a package such as the lid on a beverage container.

Figure 14:
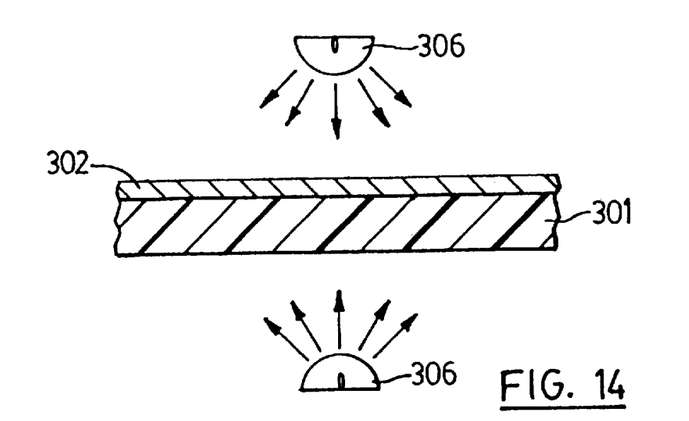
FIG. 14 is a cross section of shrink film modified according to the present inventor to include an energy absorbing layer.

FIG. 14 shows in cross section one embodiment of the invention in which the first means to transfer radiant energy into the film comprises, a thin layer of a susceptor material 302 which has been applied, and most preferably has been printed on a shrink film substrate 301. The shrink film substrate 301 can be one of any commonly made shrink films such as those sold as REYNOLON films by Reynolds Metals Company and CLYSAR films by Dupont Polymers Division and as discussed above. These may be PVC, polypropelene or polyethylene films or other films. For example, preferred films for lidding beverage containers will preferably vary in thickness from 0.0127 mm to about 0.0381 mm (approximately 50 to 150 gauge) with the most preferred range being between 0.0152 mm to 0.0191 mm, (60 to 75 gauge). It will be appreciated by those skilled in the art that the precise thickness of the film can be varied, without adversely affecting the operation of the present invention. For certain applications, when greater strength is required, even greater film thickness as may be appropriate such as 200 gauge and more. Considerations such as price, tear resistance, degree of shrink and clarity will affect the selection of an appropriate film and thickness to suit the commercial objective to be met. For lidding beverage containers, for example, food grade film is preferred.

The preferred shrink film substrate will have shrink characteristics suitable for the given packaging objectives. Some of these characteristics include the degree and orientation of the shrink and whether the shrink is to occur in both or only in one direction. Most common commercially available shrink film substrates are substantially transparent meaning that light, infrared radiation and other forms of radiant energy pass through said substrate with very little, if any, absorption. In this case, substantially transparent means that at least 75% and preferably more than 90% of radiant energy passes through said film. Such transparency has led, in the past, to the need for a heat bearing medium to physically contact the film to provide sufficient heat transfer to cause the desired shrink. It has been found that by modifying the absorption properties of the substrate film to radiant energy, improved results can be obtained as described below.

The susceptor layer 300, for the purpose of this invention, means a material which is adapted to be carried by the shrink film substrate. The key characteristic of the susceptor material is that it absorbs radiant energy, thereby creating localized heat upon being exposed to a source of radiant energy. Preferably, the susceptor material is printable such as printers ink, and includes at least one radiant energy absorbing component such as carbon black, graphite, iron oxide or other energy absorbing material. It will be appreciated by those skilled in the art that while some preferred and specific energy absorbing materials have been listed for the susceptor material, other material will also be suitable. What is desired is that the energy absorption rate of the applied susceptor material be sufficient that upon the material being exposed to radiant energy the heat generated will cause a desired amount of shrink in the shrink film substrate in a predetermined acceptable amount of time.

In some cases such shrink films may require special treatment to be made more printable, such as the application of a charged electric field known as corona treating, which is done before printing to ensure ink adhesion. For others, such as polyvinyl chloride shrink films, corona treating is not necessary for good printing results.

In the preferred embodiment of the invention, the susceptor material is printed onto the film substrate, which then becomes the susceptor material carrier. In another alternate embodiment the susceptor material is physically mixed into the film substrate and absorbs the radiant energy from within the film. This latter approach is less preferred though since the susceptor material changes the characteristics of the shrink film, such as flexibility, degree of shrink and the like.

For the purpose of this invention, radiant energy has a specific meaning. In the prior art, the terms "radiant heat," "radiant energy" and "infrared heat" have been used occasionally to loosely describe different methods of applying heat to a shrink film. The implication of these methods is that the film responded directly to these methods. Until the present invention, indirect application of heat was all that was available. By indirect, what is meant is heating a separate medium such as water or air, which then is caused to impinge upon the shrink film, thereby transferring heat to the shrink film through physical contact. This is because shrink films are generally transparent to radiant energy, and thus can absorb very little energy directly.

According to the present invention, radiant energy means energy which may be transmitted through air and then absorbed to produce heat at or on the film. In the preferred embodiment the radiant energy is infrared radiation. This is much more efficient in transferring heat energy directly to where it is needed ie. the film which shrinks when heated, as it avoids the necessity of using any other medium such as hot water or air as in the past to carry the heat to the film. Thus, radiant energy in this context means any form of radiant energy that is transmissible through a medium such as air, without being substantially absorbed thereby. The most preferred form of radiant energy is infrared light, which may be supplied, as previously described by a tungsten halogen bulb shown as 306 in FIG. 14 or the like.

As noted above, carbon black provides reasonable results when combined in a susceptor layer to absorb the radiant energy. In particular, carbon black responds readily to the radiant energy output of a tungsten halogen bulb which emits energy primarily in the visible and near infrared spectrum. Carbon black is additionally a standard pigment in printing inks and is used extensively to adjust the value of colours in the ink field. This combined ability of being able to blend with existing printing inks, and being able to absorb radiant energy such as infrared radiation, makes it suitable for the present invention.

Figure 15:
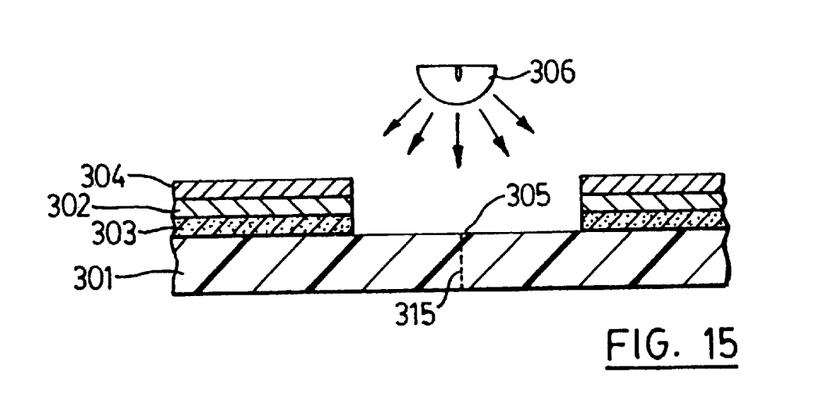
FIG. 15 is a drawing similar to FIG. 1 showing a number of superimposed layers.

Turning now to FIG. 15, there is shown a film substrate according to the present invention, with further layers as explained below. In particular, a layer 303 is provided as a barrier or reflective layer to help block the penetration of radiant energy. White pigments of the type typically used in the printing industry such as titanium dioxide are very useful to perform this function. Any radiant energy that is not absorbed by the susceptor layer 302 would pass through and be lost from performing any further useful function for heat generation. Thus, it is preferred in some cases, to include a barrier layer 303 beneath the susceptor layer 302 which layer 303 reflects most or all of the radiant energy that has managed to pass through the susceptor layer 302 back towards and into the susceptor layer 302. This provides the susceptor layer 302 another opportunity to absorb the radiant energy and to turn the same into heat. Thus, more efficient heat transfer can occur.

FIG. 15 also shows a radiant energy source 306 and a cover layer 304 which may be a colour layer as described below. Also shown is a clear area 305, where no layers are superimposed upon substrate 301.

Reference will now be made to examples to show the effect of using susceptor material, such as carbon black, and the effect of using a barrier or reflective layer 303.

EXAMPLE 1

In this example, a series of tests was performed to determine the effect of different amounts of carbon black in printing ink on the shrink characteristics of transparent shrink films, when exposed to a source of radiant energy. The test also provides information which helps predict the suitability of a susceptor material from a printed sample.

An example of these tests is described as follows. "Pantone Pro Blue" colour was chosen with 6 different levels with carbon black added. Each sample was printed on a paper stock and exposed to a 100 watt halogen bulb focussed on the sample. Directly below the sample a thermometer detected the heat gain in degrees Fahrenheit (° F.) for an elapsed time of 10 seconds. The results of the temperature given are reproduced below in Table 1. Next, the equivalent colours with the same levels of carbon black were printed on 75 gauge P.V.C. shrink film #2024 REYNOLON pre-coated with a barrier layer of titanium dioxide and exposed to the same focussed light. Titanium dioxide is also a printable material, and is substantially impervious to radiant energy. By placing the barrier layer underneath the susceptor material, more heat is generated in the susceptor material layer as stated above.

The time required to effect a shrink reaction was measured and is reproduced in Table 1 below.

TABLE 1

| % Carbon Black | Temp. Gain (° F.) (Paper Stock) | Seconds to Shrink (Shrink Film) |
| --- | --- | --- |
| 27.3 | 24 | 0.2 |
| 13.6 | 21 | 0.2 |
| 6.8 | 18 | 0.5 |
| 3.4 | 15 | 0.9 |
| 1.7 | 12 | 10+ |
| 0.8 | 10 | 10+ |

It was found that there was a minimum value of 3% (by weight) carbon black below which there was no useful response. Similarly it was found that the response was virtually instantaneous with concentrations of 13% carbon black and more. Thus to effect a quick shrink for this film, it is preferred to use at least 13 percent by weight of carbon black in the printing dye. Of course this percentage could be varied and made higher, depending upon whether a barrier layer was also used.

EXAMPLE 2

An example of the benefit provided by the barrier layer was shown by a test that was performed with the susceptor layer of 5.9% carbon black added. When printed on a P.V.C. substrate film (the same type as in Example 1), and exposed to the same light of the previous test, the elapsed time to shrink the film was 4 seconds. When printed over a barrier layer of titanium dioxide, the elapsed time for shrinking dropped to 0.8 seconds. Thus, the barrier layer below the susceptor layer, so the susceptor layer is between the barrier layer and the radiant energy source, improves the efficiency of the use of the susceptor material significantly.

Further tests were conducted whereby the susceptor layers were positioned below the barrier layer of titanium dioxide on the P.V.C. shrink film mentioned earlier. The elapsed time to shrink the film was measured and compared to the time required to shrink the film with the susceptor layer above the barrier as shown in FIG. 2 and described in Example 1. It was found that the barrier layer above the susceptor layer slowed the time to shrink the film by approximately 30%. This is not unexpected in that the barrier layer reflects away radiant energy that otherwise would impinge upon and be absorbed by the susceptor layer. It is believed that the particular barrier layer tested, titanium dioxide does not completely block the penetration of the radiation. Other types of barrier layers may be more or less effective.

In some applications it will be preferred to present an appropriate graphic design on the shrink film substrate. For example, in lidding containers, it will be desirable to put advertising designs logos or other graphic material onto the shrink film. Thus, it may be desirable to add a further printed layer over the top of the susceptor material to present such graphics.

As shown in FIG. 15 there may be provided the colour layer 304, representative of colour printing that can be printed over the susceptor and barrier layers. The layer 304 could provide a printed message or perform some other decorative function. It can be coloured to suit, or it could be combined with the colour effect of the barrier and susceptor layers. In such a case, the colour printing layer is preferably generally transparent to radiant energy, either because it is thin, or because it does not have energy absorbing constituents. Some energy absorption is acceptable though, because any energy that is so absorbed also acts to heat the substrate to cause shrink.

It can now be understood that the combination of susceptor material and barrier layer material should be such that the susceptor material retains a useful amount of radiant energy and the barrier layer blocks a significant portion of the radiant energy but that the combination of the two must be able to cause a predetermined amount of shrink within a predetermined time to meet with the packaging needs that are to be solved. For example in the fast food industry, the timing requirement for lidding a soft drink cup may be less than five seconds and most preferable less than about two seconds for the complete lidding operation. Thus, the shrink portion of the process should be as rapid as possible. In other automated assembly line operations there may be less urgency, but generally it is preferred to complete the shrink process quickly rather than slowly.

There are three main variables in the present invention. The first, is the amount of radiant energy being emitted from the source of radiant energy. The second is the degree of absorption achieved, either by the susceptor material, or the susceptor material in combination with a barrier layer or other layers. The third, is the temperature required to cause the thin film substrate to shrink. It will be appreciated that each of these variables can be changed, and compensated for to some degree by the others. A thicker more highly absorbent susceptor layer may achieve desired shrinking, but require a less powerful radiant energy source. A higher shrink temperature may require a more powerful radiant energy source or a more absortive susceptor layer. However, it can now be understood that each of these variables can be set at levels which achieve an acceptable shrink within a desired time.

Reversing the position of these layers may be desirable for aesthetic reasons, or even printing reasons, to improve the quality of the image being applied to the shrink film. Further, by applying the barrier layer above the susceptor layer selective control over the degree of shrink of specific portions of the film can be obtained. Thus in some cases rather than promoting quicker shrinking of the film upon exposure to radiant energy, a barrier layer can be used to inhibit shrinking in certain portions to preferentially shrink others.

Referring to FIG. 15, the area 305 represents a window, where no modification of the film has occurred. In this area the film does not carry a barrier or susceptor layer or any other layer. As a result, radiant energy which is being simultaneously absorbed and reflected by other portions of the films of FIG. 15 will pass right through this area 305.

Figure 18:
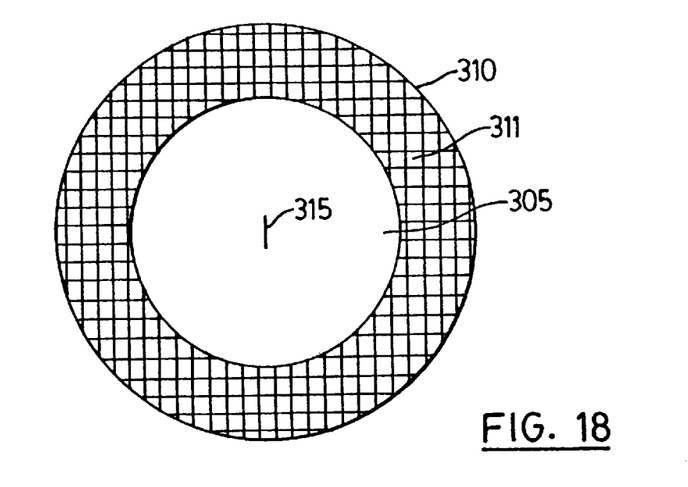
FIG. 18 is a top view of a film modified according to a predetermined pattern.
Figure 19:
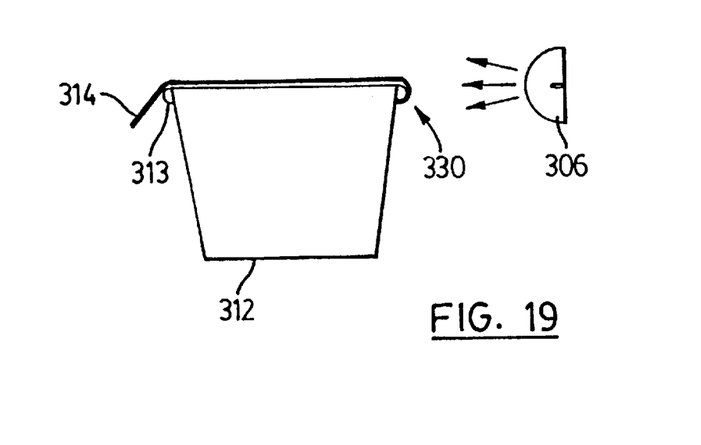
FIG. 19 is a cross section of a container and a shrink film with a sealing disc being applied.

It has been found that the relative shrink over an area of film can be very specifically controlled to suit the needs of a particular package. A specific example of this is shown in FIGS. 18 and 19, which illustrate a disc 310 of shrink film with a darkened ring 311, over a layer of susceptor material (in a manner similar to FIG. 15, but without colour layer 304). When first placed on a container 312 the substrate droops over a rim 313 of the container as shown on the left at 314. Thereafter, upon being exposed to radiant energy from a bulb 306, darkened ring 311 heats up, causing the film to shrink around the rim 313 to form a spill resistant cover. The area 305 is most preferably mostly transparent and thus does not absorb radiant energy from the bulb 306, does not heat up and does not shrink. Thus, the area 305 provides a see-through window to the contents of the container 312. In the fast food industry, this allows the purchaser to examine their soft drink for example for appropriate ice and selection. The clear area 305 may also be provided with a cut 315, in the film, to permit the entry of for example, a drinking straw. The cut 315 can be made during printing of the energy absorbing pattern on the film. Because it is in the clear area 305 the cut 315 will not enlarge or grow during the shrink step since there is no shrinking occurring immediately around it.

Figure 16:
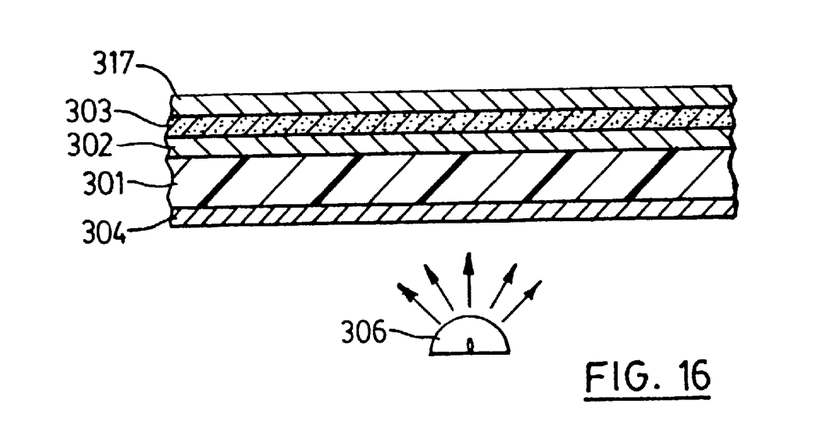
FIG. 16 is a drawing of the invention of FIG. 1 showing a different configuration of layers.

FIG. 16 shows a further configuration in which printed layer 304 is applied directly to a surface of a film. The printed layer, depending on the ink content, generally allows penetration of the radiant energy through the layer, and then through the film. The most preferred cover layer is an ink with good colour characteristics and one which has a low gloss surface that reduces specular reflection thus permitting more of the energy to be absorbed in the packaging film. Then comes the susceptor material 302 followed by barrier or reflective layer 303. In some cases there may be a requirement that the side of the packaging film carrying the various layers be exposed to food. In such a case, a food grade approved sealing layer shown as 317 may also be used, if the layers 302, 303 and 304 are not food grade approved.

Figure 17:
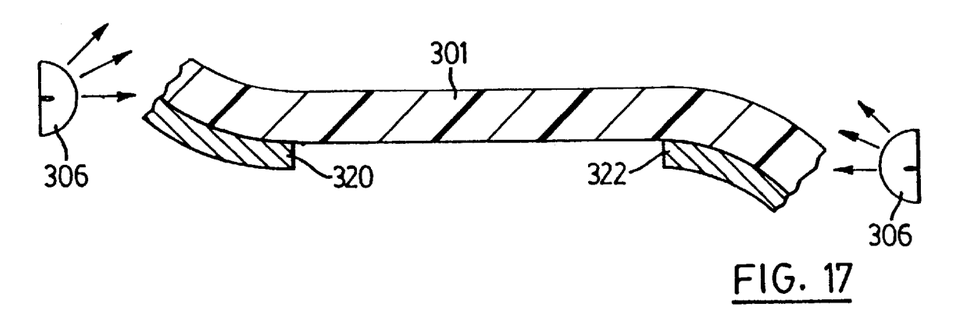
FIG. 17 is the drawing of FIG. 1 showing the effect of radiant energy being absorbed by the modified film.

FIG. 17 illustrates a substrate 301 having two opposite edges with different susceptor layers identified as 320 and 322. The layer 320 contains materials with a higher heat resistance than the materials contained in layer 322. Such material may be resins such as polyamides, acrylics and nitrocellulose, with melting temperatures ranging from 107° C. to 200° C. When susception layer 320 is exposed to the radiant energy source 306, and the melting temperature of the resin is sufficiently high, the edge curls in the manner shown in FIG. 17. When susceptor layer 322 is exposed to a radiant energy source, and the melting temperatures of the resin is sufficiently low and below that of layer 320, the film will curl in the opposite direction to the film at susceptor layer 320, also as shown in FIG. 17. In this manner, the direction of curl can be selected and controlled, and in the example of lidding beverage containers can be caused to curl neatly under the rim as shown on the right hand side of FIG. 19 at 330. Thus, by appropriate selection of susceptor layer resin composition, characteristics, and location, the curl can be specifically designed for the packaging problem being addressed, to provide a neat and finished edge appearance on the final product.

It will be appreciated by those skilled in the art that the foregoing description relates to a preferred embodiment and that various modifications can be made without departing from the broad scope of the appended claims. Some of these modifications have been discussed above and others will be apparent to those skilled in the art.

We claim:

1. A flexible packaging film which shrinks on an open topped container to form at least a part of a package for said open topped container when exposed to heat, said flexible packaging film comprising:

a thin film substrate which is flexible and that contracts when heated and which is substantially transparent to radiant energy thereby remaining substantially unchanged upon exposure to radiant energy, and a susceptor material carried by the substrate, said susceptor material being sufficiently opaque to radiant energy to absorb said radiant energy and to convert said radiant energy into heat energy and said heat energy being transferred to said substrate in an amount sufficient to cause said substrate to shrink upon said packaging film being exposed to a source of radiant energy, wherein exposure to said source of radiant energy causes the packaging film to preferentially shrink.

2. A packaging film as claimed in claim 1 wherein said film is made of food grade materials.

3. A packaging film as claimed in claim 1 wherein said susceptor material includes an energy absorbing substance.

4. A packaging film as claimed in claim 1 wherein said energy absorbing substance is carbon black.

5. A packaging film which shrinks to form a cover for an open topped container when exposed to heat, said packaging film comprising:

a thin film substrate that is flexible and contracts when heated and which is substantially transparent to radiant energy thereby remaining substantially unchanged upon exposure to radiant energy; and a susceptor material carried by the substrate, said susceptor material being sufficiently opaque to radiant energy thereby being able to absorb said radiant energy, wherein said susceptor material is carried by specific portions of said film substrate forming a susceptor layer at those portions, and other portions of said film substrate are free of susceptor material and are substantially transparent to radiant energy, and wherein upon said packaging film being exposed to a source of radiant energy said transparent portions transmit said radiant energy without appreciable warming and said portions carrying said susceptor material heat sufficiently to cause a shrinkage of said susceptor carrying portions of the film;

wherein said film further includes a barrier layer carried by at least some of said specific portions of said film substrate also carrying said susceptor layer, wherein said barrier layer substantially reflects radiant energy impinging upon said barrier layer.

6. A packaging film as claimed in claim 5 wherein said barrier layer is positioned below said susceptor material relative to a radiant energy source wherein radiant energy passing through said susceptor material impinges upon said barrier layer and is reflected back into said susceptor material, to enhance the absorption of radiant energy by said susceptor material.

7. A packaging film as claimed in claim 6 wherein said packaging film further includes a decorative layer overlying said susceptor and barrier layers.

8. A packaging film which shrinks to form at least a cover for an open topped container when exposed to heat, said packaging film comprising:

a thin film substrate that contracts when heated and which is substantially transparent to radiant energy thereby remaining substantially unchanged upon exposure to radiant energy;

a susceptor material carried by the substrate, said susceptor material being sufficiently opaque to radiant energy thereby being able to absorb said radiant energy, wherein said susceptor material is carried by specific portions of said film substrate and other portions of said film substrate are free of susceptor material and are substantially transparent to radiant energy, and wherein upon said packaging film being exposed to a source of radiant energy said transparent portions transmit said radiant energy without appreciable warming and said portions carrying said susceptor material heat sufficiently to cause a shrinkage of said susceptor carrying portions of the film;

a barrier layer carried by at least some of said specific portions of said film substrate also carrying said susceptor layer, wherein said barrier layer is positioned below said susceptor material relative to a radiant energy source, further wherein radiant energy passing through said susceptor material impinges upon said barrier layer and is reflected back into said susceptor material to enhance absorption of the radiant energy by the susceptor material; and a decorative layer overlying said susceptor and barrier layers;

wherein said barrier layer includes at least some radiant energy reflecting material, said susceptor material includes at least some radiant energy absorbing material and said decorative layer includes at least some coloring and wherein each of said barrier layer, said susceptor material and said decorative layer are formed from printable materials and are printed onto said thin film substrate.

9. A packaging film as claimed in claim 8 wherein said thin film substrate has at least one clear area and a portion upon which said layers are printed.

10. A packaging film as claimed in claim 5 wherein said barrier layer is printed onto susceptor layer, and said susceptor layer is printed onto said thin substrate.

11. A packaging film as claimed in claim 5 wherein said susceptor layer has a top side and a bottom side and wherein said barrier layer is on said top side of said susceptor layer and in use said barrier layer is between a source of radiant energy and said susceptor layer.

12. A packaging film as claimed in claim 5 wherein said susceptor layer has a top side and a bottom side and wherein said barrier layer is on said bottom side of said susceptor layer and in use said susceptor layer is between a source of radiant energy and said barrier layer.

13. A packaging film as claimed in claim 6 wherein said barrier and susceptor layers are printed in superposed rings having a clear area in the middle of said rings.

14. A packaging film as claimed in claim 13 wherein said clear area includes a cut.

15. A packaging film as claimed in claim 13 wherein a plurality of superposed rings are printed onto a flexible sheet of said thin film substrate.

16. A packaging film as claimed in claim 7 wherein said barrier layer includes titanium dioxide.

17. A packaging film as claimed in claim 7 wherein said decorative layer has a low gloss finish to facilitate penetration of radiant energy therethrough.

18. A packaging lid for lidding containers, said packaging lid including:

a thin film substrate that is flexible and which shrinks upon being heated;

a susceptor material carried by said substrate said susceptor material being sufficiently opaque to radiant energy to absorb said radiant energy and to convert said radiant energy into heat energy, said heat energy being transferred to said substrate in an amount sufficient to cause said substrate to shrink upon said packaging film being exposed to a source of radiant energy;

wherein said susceptor material is applied to said film in a pattern to permit said packaging lid to be shrunk on to a container to form a spill resistant lid.

19. A packaging lid as claimed in claim 18 further including a barrier layer carried by said substrate above or below said susceptor material and positioned relative to said susceptor material to reflect radiant energy into said susceptor material.

20. A packaging lid as claimed in claim 19 further including a decorative layer covering said susceptor layer and said barrier layer.

21. A packaging lid as claimed in claim 18 for a container having a rim, wherein said susceptor material causes said film to curl under said rim upon exposure to radiant energy.

* * * * *